June 21, 1932.   C. B. BAILEY   1,863,893

ALL METAL GASKET

Filed March 28, 1927

Inventor:
Claude B. Bailey,

Patented June 21, 1932

1,863,893

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

ALL-METAL GASKET

Application filed March 28, 1927. Serial No. 178,912.

This invention relates to all-metal gaskets particularly adapted for use between the manifolds and engine blocks of Fordson tractors, and are designed to replace the copper asbestos gaskets which have heretofore been generally used in such assemblies.

The main object of my invention is to make the gasket from a single layer of sheet metal and provide it with a plurality of folded portions arranged concentric about the gasket so as to take the pressure which is applied to the gasket when clamped in its place of use, and thus have a number of pressure receiving portions at least one of which will produce a leak-proof joint between the roughly machined surfaces between which the gasket is clamped in case the inner pressure receiving portion or portions fail for any reason to make a tight joint.

Specifically, my improved gasket is made from a single layer of sheet metal in annular form with the marginal portions about the inner and outer edges of the gasket folded or bent in a manner to provide a plurality of superimposed layers which form the pressure receiving portions of the gasket, and thus make one of said portions available should the other fail to provide a leak-proof joint between the members between which the gasket is clamped when in use.

The invention consists further in the matters hereinafter described and claimed.

In the accompanying drawing—

Figure 1:
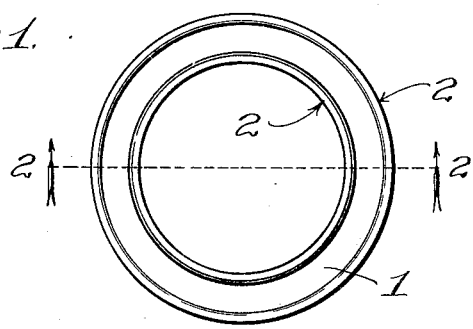
Fig. 1 is a top plan view of a gasket constructed in accordance with my invention.
Figure 2:
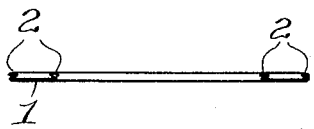
Fig. 2 is a diametrical sectional view taken on line 2—2 of Fig. 1.

My improved gasket is made from a single piece of sheet metal, such as copper, brass, aluminum, etc., and thus has all of its parts integrally connected to avoid blow-outs and other leakages that are likely to occur with a gasket made up of several parts.

The gasket shown in the drawing is annular in form and has a body portion 1 of a single layer of sheet metal. The marginal portions of the body layer 1 about the inner and outer edges of the gasket are bent or folded to provide pressure receiving portions 2, 2 composed of a plurality of superimposed layers. The number of layers making up each pressure receiving portion depends on the amount of metal required to make the cushion for the gasket, and this is determined by the roughness or smoothness of the surfaces between which the gasket is clamped when in use. Rough surfaces require more metal than smooth surfaces, as the interstices are larger and deeper in rougher surfaces than they are in smoother ones and the metal required must be sufficient to fill these interstices to make leak-proof joints when the metal is under pressure.

Figure 4:
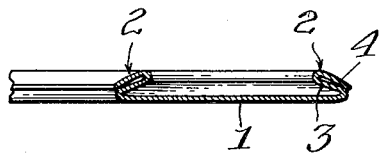
Fig. 4 is an enlarged sectional view through one side of the gasket.

For the relatively roughly machined surfaces at the ends of the manifold pipes and the adjacent portions of the engine block about the port holes with which the manifold pipes register, I find that the pressure receiving portions 2, 2 serve very well when composed of two layers 3, 4 acting in conjunction with the single layer 1 of the body gasket. As shown in Fig. 4, the layers 3, 4 of each pressure receiving portion are integrally connected about the inner edges of such layers, while the layers 3 are integrally joined with the body layer 1 about the outer edges of the latter by the folds in the metal between them. It is preferable that the layers 3, 4 of each pressure receiving portion 2 normally stand at an angle to the body layer 1 so that there is sufficient space between them and the body layer for the layers 3, 4 to yield when under clamping pressure and thus provide the cushion required for the gasket without the use of asbestos or other packing material as heretofore generally employed.

Figure 3:
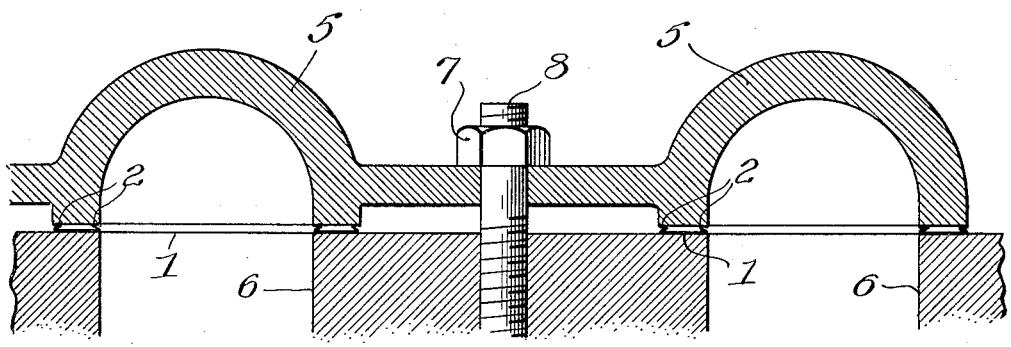
Fig. 3 shows how the gaskets are clamped between a Fordson manifold and the engine block.

In Fig. 3, the gaskets are shown clamped between manifold pipes 5, 5 and the engine block 6 with the gaskets surrounding the registering port holes or passages in these parts. The gaskets are preferably made as wide as the ends of the manifold pipes so that the pressure receiving portions 2, 2 engage the pipes in concentric relation with the body layers 1 of the gasket between them.

In clamping the pipes 5 against the block 6 by the nut 7 on the stud 8, the pressure receiving portions 2, 2 of the interposed gaskets confine the pressure on the gaskets about the inner and outer edges thereof and thus allow the manifolds to be clamped more tightly against the block than with gaskets as heretofore employed, due to the fact that this pressure is not distributed entirely over the gaskets as heretofore. Manifestly, tighter joints may be secured with my improved gaskets and the manifold has less tendency to distort under extreme heat when held closer and more rigid to the engine block. Moreover, by having a plurality of pressure receiving portions on each gasket, one of such portions will provide a leak-proof joint in case the other should not hold. With the gasket made entirely of sheet metal, all the parts are integrally connected and thus the gasket may be readily made complete in a series of stamping operations, thus reducing the cost of manufacture, as well as making a simplified structure.

The body layer 1 of the gasket between the pressure receiving portions 2, 2 may be made flat as shown, or it may be corrugated for strengthening purposes if desired. This portion of the gasket is out of the plane of the pressure receiving portions, and constitutes a seat for the gasket which will not be stretched or expanded to displace the pressure receiving portions when the latter are placed under pressure when clamping the gasket in place.

I claim as my invention:

An all-metal gasket having a body of a single layer of sheet metal, said body having its marginal portions about its inner and outer edges bent out of the plane of the body layer to one side thereof and folded to provide the pressure receiving portions of the gasket of superimposed layers, said pressure receiving portions being normally inclined upwardly and inwardly from said body layer, the latter between said pressure receiving portions being substantially flat with all portions thereof out of the plane of said pressure receiving portions to provide a non-stretchable seat for the gasket.

In testimony whereof I affix my signature this 25th day of March, 1927.

CLAUDE B. BAILEY.